United States Patent
Wang et al.

(10) Patent No.: US 11,106,224 B2
(45) Date of Patent: Aug. 31, 2021

(54) MULTI-DRONE AUTOMOTIVE SYSTEMS AND METHODS OF USE

(71) Applicant: Ford Global Technologies, LLC, Dearborn, MI (US)

(72) Inventors: Zijian Wang, Stanford, CA (US); James Carthew, Oakland, CA (US); Weifeng Xiong, Fremont, CA (US); Mohsen Lakehal-ayat, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/243,802

(22) Filed: Jan. 9, 2019

(65) Prior Publication Data

US 2020/0218287 A1 Jul. 9, 2020

(51) Int. Cl.
*G05D 1/10* (2006.01)
*B64C 39/02* (2006.01)
(Continued)

(52) U.S. Cl.
CPC ............ *G05D 1/104* (2013.01); *B64C 39/022* (2013.01); *B64C 39/024* (2013.01); *B64D 5/00* (2013.01);
(Continued)

(58) Field of Classification Search
CPC .... G05D 1/104; G05D 1/0866; B64C 39/022; B64C 2201/082; B64C 2201/148
See application file for complete search history.

(56) References Cited

U.S. PATENT DOCUMENTS 9,373,262 B2 6/2016 Stigler et al.
2013/0233964 A1* 9/2013 Woodworth ........... G05D 1/104
244/2

(Continued)

FOREIGN PATENT DOCUMENTS

WO 2017/165854 A2 9/2017

OTHER PUBLICATIONS

Reagan, J., "Xponential: Novadem Will Launch New Tethered Drone," Drone Life. Apr. 2, 2018. (2 pages). Retrieved from https://dronelife.com/2018/04/02/xponential-novadem-will-launch-new-tethered-drone/.

*Primary Examiner* — Alan D Hutchinson
*Assistant Examiner* — Andy Schneider
(74) *Attorney, Agent, or Firm* — Brandon Hicks; Eversheds Sutherland (US) LLP

(57) ABSTRACT

Exemplary embodiments described in this disclosure are generally directed to a multi-drone automotive system that includes a first drone configured to carry one or more detachable drones. The first drone, which may be referred to as a carrier drone, may be mounted upon an automobile and operated in a tethered mode of flight. The detachable drones may be launched from the carrier drone to carry out untethered flight. The carrier drone and/or the detachable drones may be used for various applications. In one example application, the carrier drone may use a first camera that is mounted upon the carrier drone, to capture a first set of images during the tethered mode of flight. A detachable drone may be launched from the carrier drone in an untethered mode of flight in order to capture a second set of images by using a second camera mounted upon the detachable drone.

20 Claims, 4 Drawing Sheets

(51) Int. Cl.
  *B64D 5/00* (2006.01)
  *G05D 1/08* (2006.01)
(52) U.S. Cl.
  CPC .. *B64C 2201/082* (2013.01); *B64C 2201/148* (2013.01); *B64C 2201/208* (2013.01); *G05D 1/0866* (2013.01)

(56) References Cited

U.S. PATENT DOCUMENTS

| | | |
|---|---|---|
| 2015/0112513 A1 | 4/2015 | Kerins et al. |
| 2016/0364989 A1* | 12/2016 | Speasl .................. B64C 39/024 |
| 2018/0208310 A1 | 7/2018 | Boyk |
| 2019/0248485 A1* | 8/2019 | Ulaganathan .......... G05D 1/104 |

* cited by examiner

MULTI-DRONE AUTOMOTIVE SYSTEMS AND METHODS OF USE

FIELD OF THE DISCLOSURE

This disclosure generally relates to unmanned aerial vehicles (drones), and more particularly relates to systems and methods related to a multi-drone automotive system.

BACKGROUND

Unmanned aerial vehicles, which are popularly referred to as drones, have been used by the military for several years. Drones are now being used extensively in a wide variety of civilian applications such as delivering various articles, inspecting sites and structures after a natural disaster, photography, and videography. Aerial photography and videography provide valuable information that may not be readily acquired through ground-based devices such as hand-held video cameras. A drone, can, for example, provide a bird's-eye view of an area that is under flood waters or has been subjected to an earthquake. The drone may be further used to airdrop supplies to stranded people in such areas. As another example, a drone may be used to explore certain areas inside a nuclear power plant in which a nuclear reactor leak has occurred. It may be very hazardous for a human being to attempt to get close to these areas even if it were possible to do so.

Nonetheless, drones have certain constraints and limitations that prevent their use in some types of applications. For example, a drone may have battery limitations that prevent the drone from being used to reach a remote destination. As another example, a drone may have limited lifting capacity that renders the drone unsuitable to carry a desired payload.

It is therefore desirable to identify and use alternative solutions in these types of situations.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
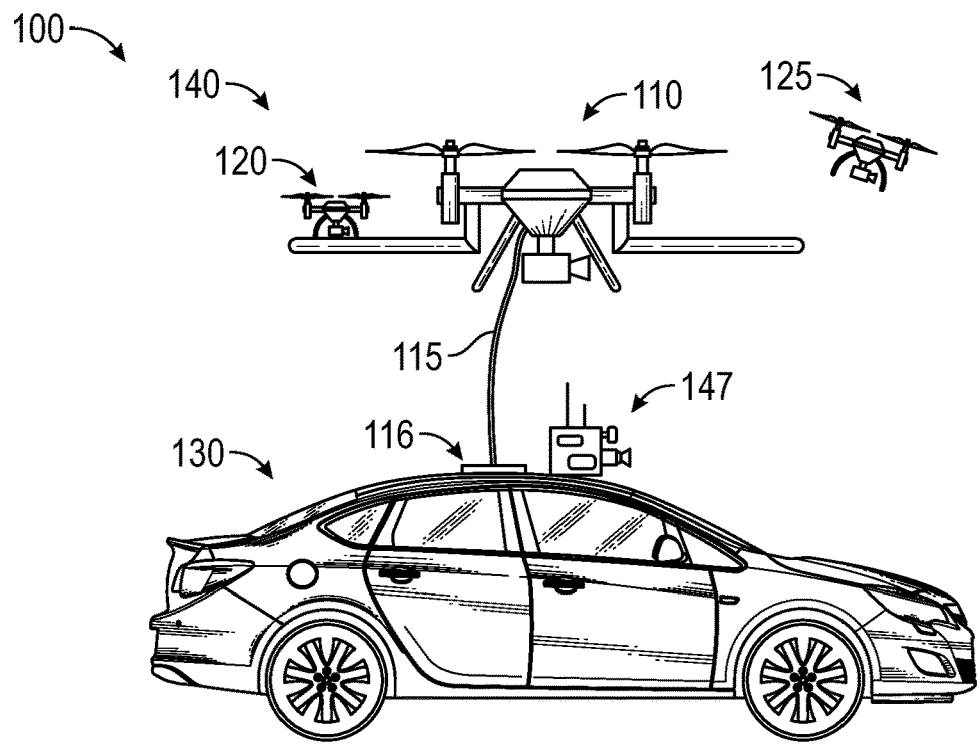
FIG. 1 shows an exemplary multi-drone automotive system in accordance with an embodiment of the disclosure.
Figure 1:
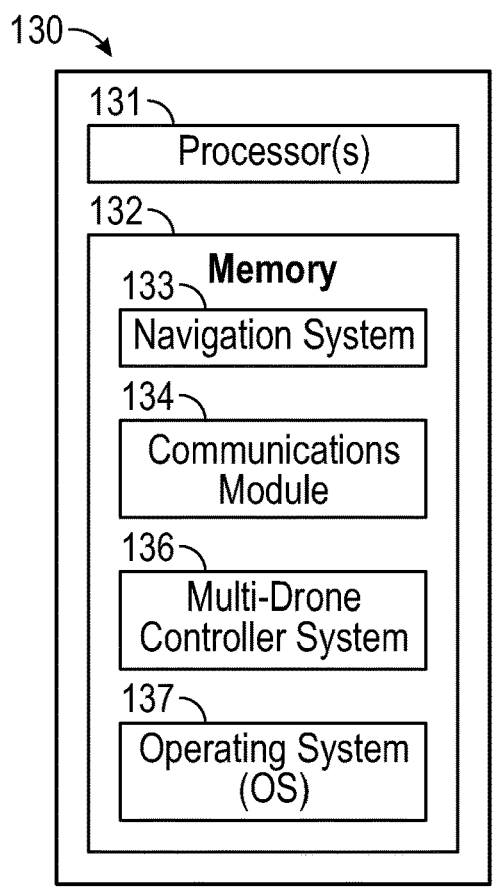

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "automotive system" as used herein refers to various types of devices and systems that may be mounted upon, attached to, or transported in an automobile such as a vehicle that is driven by a human being or is an autonomous vehicle. The phrase "autonomous vehicle" may be referred to alternatively in general parlance and/or in this disclosure as a "self-driven vehicle" or a "robotic vehicle." The vehicles that are referred to in this disclosure may include a wide variety of vehicles (civilian vehicles, military vehicles, etc.). Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods related to a multi-drone automotive system that includes a first drone configured to carry one or more detachable drones. The first drone, which may be referred to as a carrier drone, may be mounted upon a vehicle and operated in a tethered mode of flight. One or more of the detachable drones may be launched from the carrier drone to carry out untethered flight. The carrier drone and/or the detachable drones may be used for various applications. In one example application, the carrier drone may use a first camera that is mounted upon the carrier drone to capture a first set of images during the tethered mode of flight. A detachable drone may be launched from the carrier drone in an untethered mode of flight in order to capture a second set of images by using a second camera mounted upon the detachable drone.

FIG. 1 shows an exemplary multi-drone automotive system 100 in accordance with an embodiment of the disclosure. The multi-drone automotive system 100 may include a multi-drone apparatus 140 mounted upon an automobile. In this example, the automobile is an autonomous vehicle 105 that may include various components such as a computer system 130 and a sensor system 147. The computer system 130 may include several components such as a processor 131 and a memory 132. The memory 132, which is one example of a non-transitory computer-readable medium, may be used to store an operating system (OS) 137 and various other code modules such as a navigation system 133, a communications module 134, and a multi-drone controller system 136. The various code modules may be configured to cooperate with various types of hardware provided in the autonomous vehicle 105 for carrying out various operations. For example, the navigation system 133 may include software that cooperates with various types of hardware components in the autonomous vehicle 105. A few examples of such hardware may include the sensor system 147 and various components (not shown) such as a steering mechanism, an ignition switch, an accelerator, a braking mechanism, a door lock mechanism of the autonomous vehicle 105, and a Global Positioning System (GPS) system. The sensor system 147 may include one or more of various components such as video cameras, motion detectors, distance sensors, proximity sensors, and audio sensors that may be used by the computer system 130 to guide the autonomous vehicle 105 safely through traffic, such as a mix of vehicles and pedestrians encountered in a city.

The communications module 134 may be configured to permit the autonomous vehicle 105 to communicate with various entities such as a ride service operator, a passenger of a ride service, another autonomous vehicle, or an internet-enabled device. The communications may be carried out in various ways, such as via a network (not shown) or wirelessly, and by using various types of communication formats. The communication formats may include machine-to-machine communication formats and human-to-machine communication formats (voice-controlled applications, for example).

The multi-drone controller system 136 may be configured to execute and control various operations of the multi-drone apparatus 140 by transmitting and/or receiving various types of signals via a tethering cable 115, and/or wirelessly. The tethering cable 115 may include one or more wires such as a pair of wires that provide power to the multi-drone apparatus 140. In this example embodiment, the multi-drone apparatus 140 includes a carrier drone 110 configured to carry a first detachable drone 120 and a second detachable drone 125. In other embodiments, the multi-drone apparatus 140 may include a carrier drone 110 configured to carry a single detachable drone or more than two detachable drones. When more than two detachable drones are carried by the carrier drone 110, some or all of the detachable drones may be operated in an identical, or similar, manner as described in this disclosure with reference to the first detachable drone 120 and the second detachable drone 125. The tethering cable 115 may further include one or more wires that carry communication signals between the computer system 130 and the carrier drone 110. A few examples of such communication signals include control signals used by the computer system 130 to control various functions of the multi-drone apparatus 140.

In an exemplary implementation, the computer system 130 may be incorporated into a transmitter, and the carrier drone 110 may include a receiver that receives signals from the transmitter via the tethering cable 115. The receiver in the carrier drone 110 may include some components that are included in the computer system 130 (such as the processor 131 and the memory 132 containing the operating system (OS) 137) and may include additional components such as a signal input interface, a signal processor, and signal drive components that may provide control signals for operating various elements of the carrier drone 110.

In this example embodiment, the autonomous vehicle 105 has a primary launch platform 116 installed on a roof of the autonomous vehicle 105. The primary launch platform 116, which can be installed on other locations on the autonomous vehicle 105 such as a trunk lid, for example, is configured for mounting the multi-drone apparatus 140 upon the autonomous vehicle 105. Mounting of the multi-drone apparatus 140 upon the primary launch platform 116 may include various actions such as securing one or more legs of the carrier drone 110 upon the primary launch platform 116 and placing the tethering cable 115 in a coiled form in a cable housing provided in the primary launch platform 116. The legs of the carrier drone 110 may be secured to the primary launch platform 116 by using releasable anchors such as clasps, latches, and/or hooks. The releasable anchors may be activated under control of the computer system 130 and/or a computer system (not shown) in the multi-drone apparatus 140.

Launching of the multi-drone apparatus 140 from the autonomous vehicle 105 may be carried out by activating the releasable anchors, powering up the carrier drone 110, and configuring the propellers of the carrier drone 110 to lift the carrier drone 110 upwards from the primary launch platform 116 and away from the autonomous vehicle 105. The tethering cable 115 that is in a coiled form inside the cable housing is configured to automatically uncoil and permit the carrier drone 110 to rise unhindered from the primary launch platform 116 to execute a tethered mode of flight. Control signals transmitted through the tethering cable 115 may then be used to control various flight characteristics of the multi-drone apparatus 140, such as direction of movement, hovering speed (when the autonomous vehicle 105 is in a stopped condition), and forward motion speed (when the autonomous vehicle 105 is moving forward).

The carrier drone 110 may receive power through the tethering cable 115, thereby allowing the multi-drone apparatus 140 to stay aloft for an extended period of time. In one example implementation, the power may be provided to the carrier drone 110 via one or more batteries located in the primary launch platform 116. The batteries located in the primary launch platform 116 may be rechargeable batteries that are charged by the autonomous vehicle 105 when the carrier drone 110 is docked in the primary launch platform 116. In another example implementation, power may be provided to the carrier drone 110 by the autonomous vehicle 105, such as via a battery of the autonomous vehicle 105 or an electrical power generator that is coupled to the engine of the autonomous vehicle 105.

The maximum range of flight of the carrier drone 110 with respect to the autonomous vehicle 105 may be defined in part by an operational length of the tethering cable 115. The operational length, which may be a little less than an actual length of the tethering cable 115, allows the carrier drone 110 to fly unhindered by the tethering cable 115, during the tethered mode of flight.

Each of the first detachable drone 120 and the second detachable drone 125 that is carried by the carrier drone 110 is detachably anchored to the carrier drone 110. For example, one or more legs of the first detachable drone 120 may be secured to an auxiliary launch platform provided on the carrier drone 110. One or more legs of the second detachable drone 125 may be similarly secured to another auxiliary launch platform provided on the carrier drone 110. The securing of the leg(s) may be carried out by using releasable anchors such as clasps, latches, and/or hooks that may be activated under control of the computer system 130 and/or a computer system (not shown) in the carrier drone 110. In some applications, one of the first detachable drone 120 or the second detachable drone 125 may be omitted and the corresponding auxiliary launch platform may be left unoccupied.

Launching of the second detachable drone 125 (which is shown in flight in FIG. 1) from the carrier drone 110 during the tethered mode of flight, may be carried out by activating the releasable anchors to release the legs of the second detachable drone 125, powering up the second detachable drone 125, and configuring the propellers of the second detachable drone 125 to move the second detachable drone 125 away from the carrier drone 110. (The first detachable drone 120 may be launched in a similar manner from the carrier drone 110, along with the second detachable drone 125 at a substantially coincident launch time, or at a different launch time.) The carrier drone 110 may stay aloft after launching the second detachable drone 125 or may return to the primary launch platform 116.

After launch, the second detachable drone 125 (and/or the first detachable drone 120) can operate in an untethered mode of flight that is not constrained by the tethering cable 115. The maximum range of flight of each of the first detachable drone 120 and the second detachable drone 125 may be defined in part by respective onboard batteries provided in each of the first detachable drone 120 and the second detachable drone 125. The maximum range of flight of each of the first detachable drone 120 and the second detachable drone 125 may be further defined by a payload capacity of a respective one of the first detachable drone 120 and the second detachable drone 125.

The overall maximum range of flight of the multi-drone apparatus 140 may be defined as a combination of a maximum range of flight of the carrier drone 110 in the tethered mode of flight and a maximum range of flight of one of the first detachable drone 120 or the second detachable drone 125 (whichever has greater range). Each of the first detachable drone 120 and the second detachable drone 125 may also be launched from the carrier drone 110 when the carried drone 110 is docked upon the primary launch platform 116.

In one exemplary application, one or both, of the first detachable drone 120 and the second detachable drone 125, may include wireless transponders. The wireless transponders may be used for wireless communication between any two or more of the following: the first detachable drone 120, the second detachable drone 125, the carrier drone 110, and the computer system 130 in the autonomous vehicle 105. For example, the computer system 130 in the autonomous vehicle 105 may transmit control signals to the second detachable drone 125 to control the actions of the second detachable drone 125 when the second detachable drone 125 is in flight. The second detachable drone 125 may transmit information signals and/or status signals to the computer system 130 when the second detachable drone 125 is in flight. In an exemplary implementation, the carrier drone 110 is configured as a hub for relaying information between the computer system 130 and one or both of the first detachable drone 120 and the second detachable drone 125.

Figure 2:
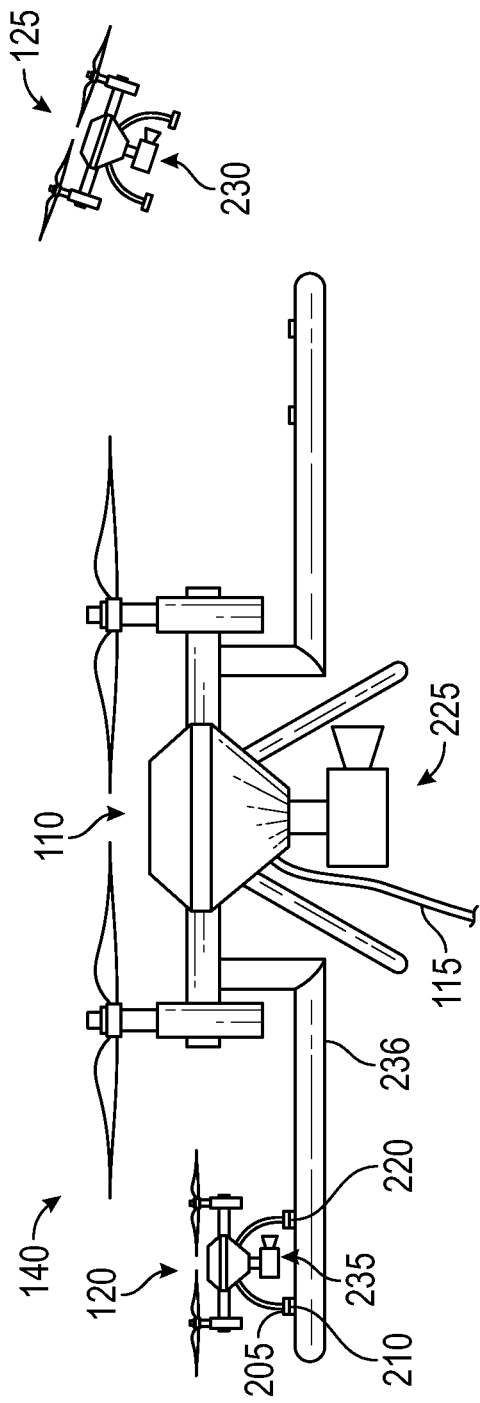
FIG. 2 shows an exemplary carrier drone that carries two exemplary detachable drones in accordance with an embodiment of the disclosure.

FIG. 2 shows some additional aspects of the carrier drone 110 in accordance with an exemplary embodiment of the disclosure. In this exemplary embodiment, the carrier drone 110 is equipped with an imaging system 225 that allows the carrier drone 110 to capture a first set of images when in the tethered mode of flight. The imaging system 225 may include various types of components such as those used in the sensor system 147, and may also include additional components such as a video camera having a lens system with zoom and/or wide-angle capabilities, and/or an infrared imager. The first set of images captured by the imaging system 225 may provide information about objects located in the vicinity of the autonomous vehicle 105. In another exemplary embodiment, the carrier drone 110 may be equipped with other types of equipment in place of the imaging system 225. For example, the carrier drone 110 may be equipped with a package to be delivered, or a sensor for detecting various types of objects or materials.

The first detachable drone 120 is equipped with an imaging system 235 that may include various types of components such as those used in the sensor system 147 and/or other components. The second detachable drone 125 is equipped with an imaging system 230 that may include various types of components such as those used in the sensor system 147 and/or other components. In another exemplary embodiment, the equipment provided in the first detachable drone 120 and the second detachable drone 125 may differ with respect to one another and may be used to perform different functions.

The imaging system 225 may be heavier than the imaging system 230 (and/or the imaging system 235) because the carrier drone 110 may be constructed for carrying a heavier payload. The heavier payload capacity of the carrier drone 110 may be attributed in part to eliminating on-board battery systems, or to using on-board battery systems having reduced requirements. The carrier drone 110 may be powered by the autonomous vehicle 105 via the tethering cable 115, thereby eliminating or reducing on-board battery system requirements. The power supply used by the autonomous vehicle 105 to provide power to the carrier drone 110 via the tethering cable 115 may offer a higher wattage than an on-board battery system on the carrier drone 110, thereby allowing the carrier drone 110 to carry heavier payloads than would be feasible with the on-board battery system. The heavier payloads may include the first detachable drone 120 and the second detachable drone 125 prior to launch of the first detachable drone 120 and/or the second detachable drone 125 from the carrier drone 110.

The carrier drone 110 may include one or more auxiliary launch platforms that are used for anchoring detachable drones. In this exemplary embodiment, the carrier drone 110 has a first extension bracket 236 that includes a first auxiliary launch platform having a first releasable anchor 210 and a second releasable anchor 220. One or both of these releasable anchors may include elements such as clasps, latches, and/or hooks that may be activated under control of the computer system 130 in the autonomous vehicle 105, and/or a computer system (not shown) in the carrier drone 110. Some examples of latches may include a mechanical latch, an electromechanical latch, or an electromagnetic latch.

In one exemplary implementation, each of the first releasable anchor 210 and the second releasable anchor 220 is shaped as a holding block. The holding block may be made of metal and configured to operate as an electromagnetic latch. The first detachable drone 120 has a first leg that includes a metal base 205 that is placed in contact with the holding block of the first releasable anchor 210. The computer system 130 in the autonomous vehicle 105 and/or a computer system (not shown) in the carrier drone 110 provides an anchoring current to the holding block of the first releasable anchor 210. The anchoring current is selected to energize the electromagnetic latch and retain the first leg of the first detachable drone 120 in an anchored position via electromagnetic action. The anchoring current may be removed when the first detachable drone 120 is to be launched from the carrier drone 110, thereby freeing the first leg of the first detachable drone 120 from the first releasable anchor 210. The second releasable anchor 220 operates in a similar manner with respect to another leg of the first detachable drone 120. Similar configurations may be used for additional legs if present in the first detachable drone 120.

The second detachable drone 125 may be similarly anchored to the carrier drone 110. In the example figure, the second detachable drone 125 has been launched from the carrier drone 110 and is in an untethered mode of flight. The imaging system 230 of the second detachable drone 125 may be used to capture a second set of images. The second set of images may provide information about objects located at a distance from the autonomous vehicle 105, in contrast to the first set of images captured by the imaging system 225 of the carrier drone 110 that may provide information about objects located in the vicinity of the autonomous vehicle 105. In one example scenario, the first set of images may show a traffic jam in the vicinity of the autonomous vehicle 105, and the second set of images may provide information about a traffic accident that has occurred about a mile ahead of the autonomous vehicle 105 that has led to the traffic jam. The two sets of images may be used by the navigation system 133 in the computer system 130 of the autonomous vehicle 105 to recognize the cause of the traffic jam and to reroute the autonomous vehicle 105 via a different route. Using the multi-drone apparatus 140 in this manner may eliminate the need to obtain traffic information from an alternative source such as Google Traffic™ or a city traffic monitoring agency for rerouting purposes.

The second detachable drone 125 (or the first detachable drone 120) may be launched from the carrier drone 110 on an as-needed basis (such as when the imaging system 225 of the carrier drone 110 indicates a traffic jam), thereby conserving battery consumption in the second detachable drone 125 and extending the range of flight and/or the time of flight of the second detachable drone 125. In one exemplary embodiment, the carrier drone 110 may be equipped with a wireless charging system (not shown) such as a near-field communications (NFC) charging system, which is used for charging the battery system in each of first detachable drone 120 and the second detachable drone 125.

Figure 3:
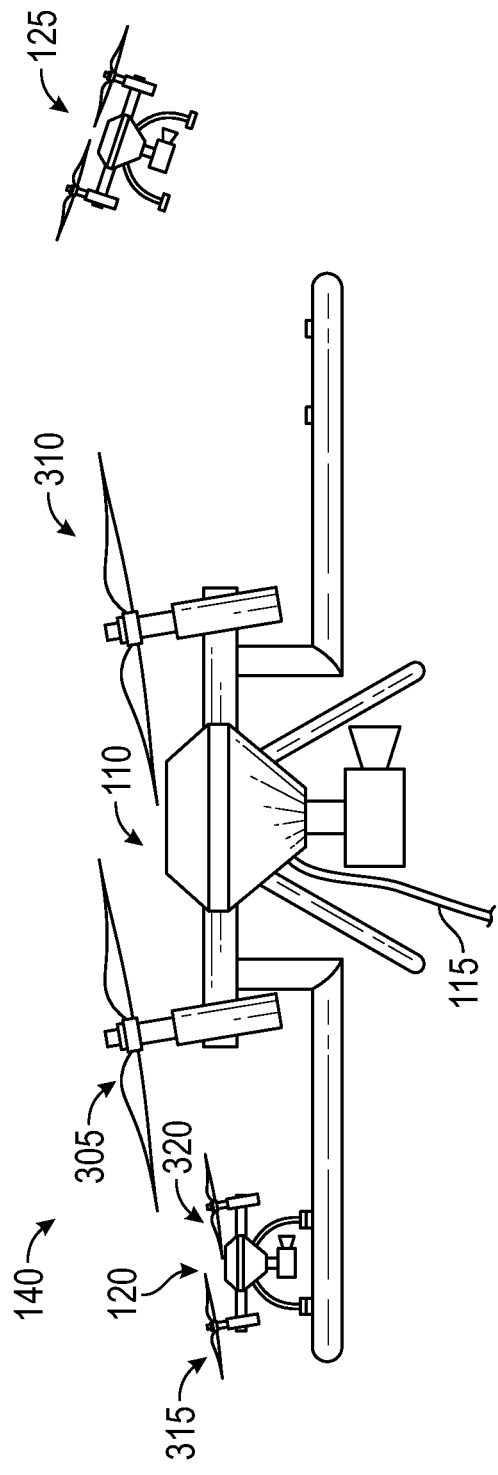
FIG. 3 shows an exemplary detachable drone assisting a carrier drone during flight, in accordance with an embodiment of the disclosure.

FIG. 3 shows an exemplary operating condition of the carrier drone 110 in accordance with the disclosure. In this exemplary operating condition, the first detachable drone 120 assists the carrier drone 110 when the carrier drone 110 is in the tethered mode of flight. The carrier drone 110 may include one or more rotors, such as a first rotor 305 and a second rotor 310, which may be configured by the computer system 130 in the autonomous vehicle 105 for controlling various operations of the carrier drone 110. For example, the computer system 130 may control the first rotor 305 and/or the second rotor 310 to set a direction of movement of the carrier drone 110, a hovering speed of the carrier drone 110 (when the autonomous vehicle 105 is in a stopped condition), and/or a forward motion speed of the carrier drone 110 (when the autonomous vehicle 105 is moving forward).

In some situations, the carrier drone 110 may not have an adequate capacity to carry out certain commands provided by the computer system 130. For example, the computer system 130 may provide a command that sets a forward motion speed of the carrier drone 110 to match a relatively high speed of the autonomous vehicle 105. A weight of the carrier drone 110 may inhibit the carrier drone from achieving the desired forward motion speed. The computer system 130 may detect this condition and configure the first detachable drone 120 to assist the carrier drone 110 in moving forward.

The assistance procedure may be carried out by the computer system 130 determining various operating parameters of the carrier drone 110 such as an angular tilt of each rotor, a rotational speed of each rotor, and an orientation of each rotor. The computer system 130 may then execute an algorithm that uses these operating parameters of the carrier drone 110 for determining optimal flight parameters for the first detachable drone 120. The computer system 130 may then transmit one or more commands to the first detachable drone 120 (via the tethering cable 115) for placing the first detachable drone 120 in an assisting mode of operation. The assisting mode of operation may include configuring a first rotor 315 of the first detachable drone 120 (angular tilt, speed, orientation, etc.) to match the first rotor 305 of the carrier drone 110 and configuring a second rotor 320 of the first detachable drone 120 (angular tilt, speed, orientation, etc.) to match the second rotor 310 of the carrier drone 110, thereby assisting the carrier drone 110 in achieving forward motion speed (or other flight characteristics).

The second detachable drone 125 may be used in lieu of, or in addition to, the first detachable drone 120 to assist the carrier drone 110. The assisting mode of operation, when provided by the first detachable drone 120 and/or the second detachable drone 125, may be terminated by the computer system 130 when the assisting mode is no longer needed or when the untethered mode of flight is desired by use of the first detachable drone 120 and/or the second detachable drone 125.

Figure 4:
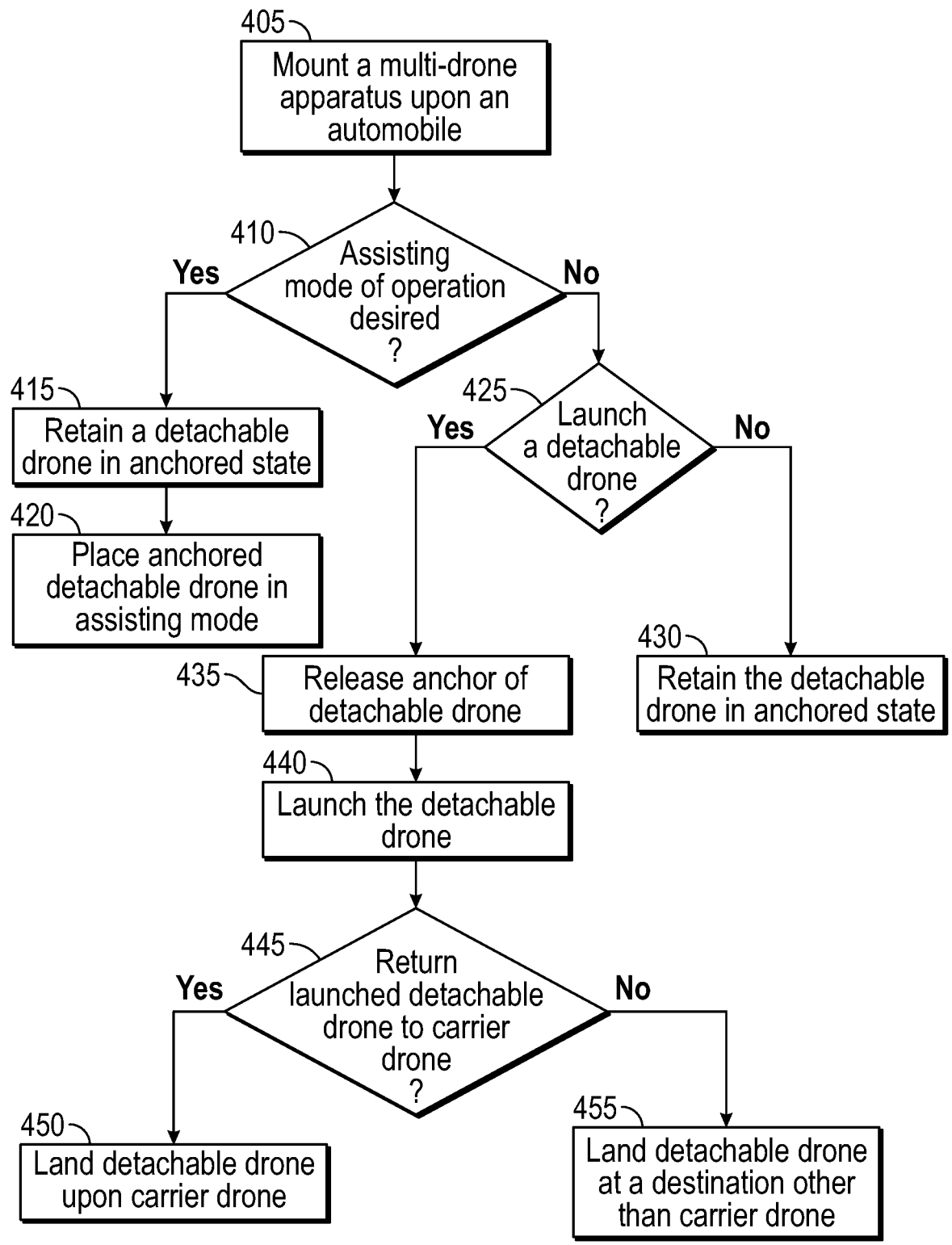
FIG. 4 shows a flowchart that illustrates an exemplary method for operating a multi-drone automotive system in accordance with an embodiment of the disclosure.

FIG. 4 shows a flowchart 400 that illustrates an exemplary method for operating a multi-drone automotive system in accordance with the disclosure. The flowchart 400 illustrates an exemplary sequence of operations that can be implemented in hardware, software, or a combination thereof. In the context of software, the operations represent computer-executable instructions stored on one or more non-transitory computer-readable media such as the memory 132, that, when executed by one or more processors such as the processor 131, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 400 may be carried out by using an application stored in the memory 132 and executed by the processor 131 of the computer system 130. The operations have been described using the multi-drone automotive system 100 for explanation purposes. However, the flowchart 400 may be equally applicable to various other multi-drone automotive systems.

At block 405, a multi-drone assembly such as the multi-drone apparatus 140 is mounted upon an automobile such as the autonomous vehicle 105. In one exemplary embodiment, mounting the multi-drone apparatus 140 upon the autonomous vehicle 105 may be carried out by mounting the carrier drone 110 upon the primary launch platform 116 installed on the roof of the autonomous vehicle 105.

At block 410, a determination may be made on whether an assisting mode of operation is desired for assisting the carrier drone 110 when the carrier drone 110 is in a tethered mode of flight. If the assisting mode of operation is desired, at block 415, at least one of the first detachable drone 120 or the second detachable drone 125 is retained in an anchored state upon the carrier drone 110. For example, the first detachable drone 120 may remain anchored upon the carrier drone 110 as shown in FIG. 2. At block 420, the first detachable drone 120 is placed in the assisting mode of operation as described above with reference to FIG. 3.

If at block 410, the assisting mode of operation is not desired, a determination may be made at block 425 on whether to launch one or both of the first detachable drone 120 and the second detachable drone 125 from the carrier drone 110. If no launching is desired, at block 430, the first detachable drone 120 and the second detachable drone 125 remain anchored to the carrier drone 110. If at block 425, it is desired to launch the second detachable drone 125, for example, at block 435, the releasable anchor of the second detachable drone 125 is activated. The activation may be carried out for example, by removing anchoring currents provided to electromagnetic latches in the first releasable anchor 210 and the second releasable anchor 220 that are shown in FIG. 2.

At block 440, the second detachable drone 125 (in this example) is launched from the carrier drone 110. The second detachable drone 125 may then execute an untethered mode of flight. At block 445 a determination may be made on whether to have the second detachable drone 125 return to the carrier drone 110. If the determination is to have the second detachable drone 125 return to the carrier drone 110, at block 450, the second detachable drone 125 is configured to land upon the second auxiliary platform of the carrier drone 110 and anchored in place. If the determination in block 445 is to have the second detachable drone 125 land at a different landing destination, at block 455, the second detachable drone 125 is directed to land at a destination other than upon the carrier drone 110. For example, the second detachable drone 125 may be directed to land upon a sidewalk next to the autonomous vehicle or upon a building.

Figure 5:
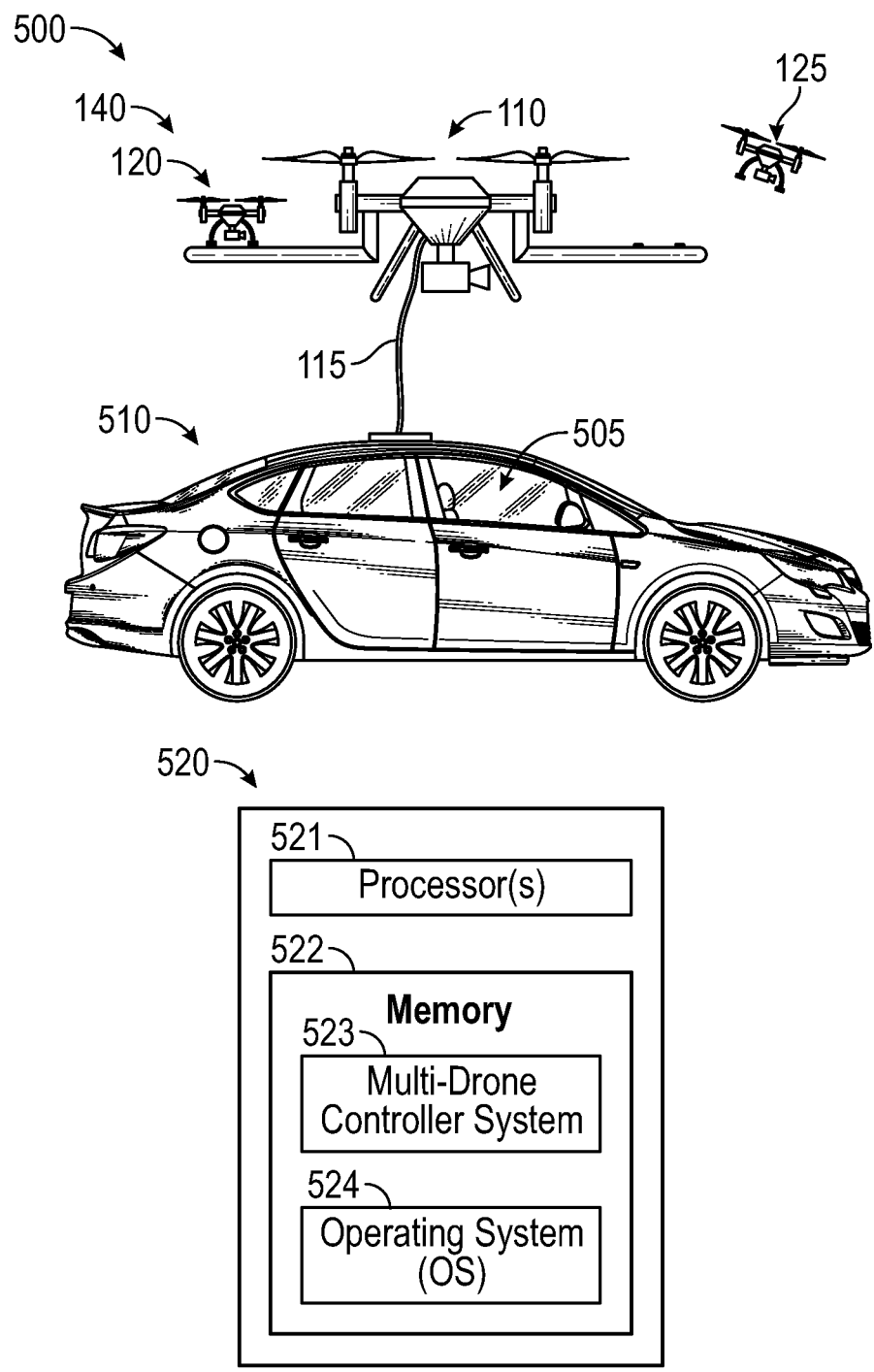
FIG. 5 shows another exemplary multi-drone automotive system in accordance with an embodiment of the disclosure.

FIG. 5 shows an exemplary multi-drone automotive system 500 in accordance with an embodiment of the disclosure. The multi-drone automotive system 500 may include an automobile that is equipped with the multi-drone apparatus 140. In this example, the automobile is a human-operated vehicle 510 that may include a computer system 520. The computer system 520 may include several components such as a processor 521 and a memory 522. The memory 522, which is another example of a non-transitory computer-readable medium, may be used to store an operating system (OS) 524 and various other code modules such as a multi-drone controller system 523. The multi-drone controller system 523 may execute some of the functionalities executed by the multi-drone controller system 136 shown in FIG. 1. However, some of the functionalities executed by the multi-drone controller system 136 may be omitted or modified, and these functionalities may be performed by a driver 505 of the human-operated vehicle 510. For example, the driver 505 may carry out some of the operations described in the flowchart 400 shown in FIG. 4, such as in block 410, in block 425, and in block 445. The computer system 520 may use the multi-drone controller system 523 to carry out the operations of some or all of the other blocks in the flowchart 400.

EXAMPLE EMBODIMENTS

In some instances, the following examples may be implemented together or separately by the systems and methods described herein.

Example 1 may include a method comprising: mounting a first drone upon an automobile; detachably anchoring a second drone to the first drone; launching the first drone from the automobile in a tethered mode of flight; and launching the second drone from the first drone in an untethered mode of flight.

Example 2 may include the method of example 1, wherein the first drone is a carrier drone and the second drone is a detachable drone that is detachably anchored to the carrier drone.

Example 3 may include the method of example 2 and/or some other example herein, further comprising: landing the detachable drone upon the carrier drone after completion of the untethered mode of flight.

Example 4 may include the method of example 2 and/or some other example herein, further comprising: providing power to the detachable drone from the carrier drone when the detachable drone is detachably anchored to the carrier drone; and providing power to the detachable drone from one or more batteries in the detachable drone when the detachable drone is in the untethered mode of flight.

Example 5 may include the method of example 2 and/or some other example herein, further comprising: placing the detachable drone in an assisting mode of operation to assist the carrier drone when the detachable drone is detachably anchored to the carrier drone and the carrier drone is in the tethered mode of flight.

Example 6 may include the method of example 5 and/or some other example herein, wherein the assisting mode of operation comprises configuring one or more engines of the detachable drone to assist the carrier drone to move in a direction of travel.

Example 7 may include the method of example 1 and/or some other example herein, further comprising: detachably anchoring a third drone to the first drone; and launching the third drone from the first drone in the untethered mode of flight.

Example 8 may include a system comprising: a first drone mounted upon an automobile, the first drone configured to operate in a tethered mode of flight from the automobile; and a second drone detachably anchored to the first drone, the second drone operable to detach from the first drone and operate in an untethered mode of flight.

Example 9 may include the system of example 8, further comprising: a third drone detachably anchored to the first drone, the third drone operable to detach from the first drone and operate in the untethered mode of flight.

Example 10 may include the system of example 8 and/or some other example herein, wherein the first drone is configured to provide power to the second drone when the second drone is detachably anchored to the first drone, and wherein the second drone includes one or more batteries that provide power to the second drone when the second drone is in the untethered mode of flight.

Example 11 may include the system of example 8 and/or some other example herein, further comprising: a controller; and an anchor assembly for detachably anchoring the second drone to the first drone, the anchor assembly comprising at least one of a mechanical latch, an electromechanical latch, or an electromagnetic latch that is activated under control of the controller.

Example 12 may include the system of example 11 and/or some other example herein, wherein the automobile is an autonomous vehicle and the controller is a part of a computer system of the autonomous vehicle.

Example 13 may include the system of example 8 and/or some other example herein, further comprising: a controller operable to provide one or more control signals for placing the second drone in an assisting mode of operation to assist the first drone when the second drone is detachably anchored to the first drone and the first drone is in the tethered mode of flight.

Example 14 may include the system of example 13 and/or some other example herein, wherein the controller is configured to detect a direction of travel of the first drone and configure the second drone to assist the first drone to move in the direction of travel.

Example 15 may include the system of example 14 and/or some other example herein, wherein configuring the second drone to assist the first drone to move in the direction of travel comprises orienting one or more propellers of the second drone to propel the second drone in the direction of travel.

Example 16 may include the system of example 14 and/or some other example herein, wherein configuring the second drone to assist the first drone to move in the direction of travel comprises controlling a speed of at least one motor in the second drone.

Example 17 may include a method comprising: mounting a first drone upon an automobile, the first drone comprising an anchor assembly for detachably anchoring a second drone to the first drone; launching the first drone from the automobile in a tethered mode of flight; and configuring the second drone that is detachably anchored to the first drone, to assist the first drone to move in a direction of travel during the tethered mode of flight.

Example 18 may include the method of example 17, wherein configuring the second drone to assist the first drone to move in the direction of travel comprises orienting one or more propellers of the second drone to propel the second drone in the direction of travel of the first drone.

Example 19 may include the method of example 18 and/or some other example herein, wherein the automobile is an autonomous vehicle that includes a computer system, the computer system comprising a controller operable to provide one or more control signals for configuring the second drone to assist the first drone to move in the direction of travel.

Example 20 may include the method of example 17 and/or some other example herein, further comprising: launching the second drone from the first drone in an untethered mode of flight.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 132 and the memory 522, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   mounting a first drone upon an automobile;
   detachably anchoring a second drone to the first drone, wherein detachably anchoring the second drone to the first drone comprises:
      positioning a second drone on the first drone, wherein the second drone comprises a leg, and wherein the first drone comprises a releasable anchor; and
      activating the releasable anchor to retain the leg in an anchored position on the first drone;
   launching the first drone from the automobile in a tethered mode of flight;
   activating the releasable anchor to release the leg; and
   launching the second drone from the first drone in an untethered mode of flight.

2. The method of claim 1, wherein the first drone is a carrier drone and the second drone is a detachable drone that is detachably anchored to the carrier drone.

3. The method of claim 2, further comprising:
   landing the detachable drone upon the carrier drone after completion of the untethered mode of flight.

4. The method of claim 2, further comprising:
   providing power to the detachable drone from the carrier drone when the detachable drone is detachably anchored to the carrier drone; and
   providing power to the detachable drone from one or more batteries in the detachable drone when the detachable drone is in the untethered mode of flight.

5. The method of claim 2, further comprising:
   placing the detachable drone in an assisting mode of operation to assist the carrier drone when the detachable drone is detachably anchored to the carrier drone and the carrier drone is in the tethered mode of flight, wherein the assisting mode of operation comprises configuring a first rotor of the detachable drone to match a second rotor of the carrier drone.

6. The method of claim 5, wherein the assisting mode of operation comprises configuring one or more engines of the detachable drone to assist the carrier drone to move in a direction of travel.

7. The method of claim 1, further comprising:
   detachably anchoring a third drone to the first drone; and
   launching the third drone from the first drone in the untethered mode of flight.

8. A system comprising:
   an automobile;
   a first drone mounted upon the automobile, the first drone configured to operate in a tethered mode of flight from the automobile, wherein the first drone comprises a releasable anchor; and
   a second drone detachably anchored to the first drone, the second drone operable to detach from the first drone and operate in an untethered mode of flight, wherein the second drone comprises a leg, and wherein the releasable anchor is configured to retain the leg in an anchored position on the first drone based on the second drone landing on the first drone, and the releasable anchor is further configured to release the leg to launch the second drone from the first drone.

9. The system of claim 8, further comprising:
a third drone detachably anchored to the first drone, the third drone operable to detach from the first drone and operate in the untethered mode of flight.

10. The system of claim 8, wherein the first drone is configured to provide power to the second drone when the second drone is detachably anchored to the first drone, and wherein the second drone includes one or more batteries that provide power to the second drone when the second drone is in the untethered mode of flight.

11. The system of claim 8, further comprising:
a controller; and
an anchor assembly for detachably anchoring the second drone to the first drone, the anchor assembly comprising at least one of a mechanical latch, an electromechanical latch, or an electromagnetic latch that is activated under control of the controller.

12. The system of claim 11, wherein the automobile is an autonomous vehicle and the controller is a part of a computer system of the autonomous vehicle.

13. The system of claim 8, further comprising:
a controller operable to provide one or more control signals for placing the second drone in an assisting mode of operation to assist the first drone when the second drone is detachably anchored to the first drone and the first drone is in the tethered mode of flight, wherein the assisting mode of operation comprises configuring a first rotor of the detachable drone to match a second rotor of the carrier drone.

14. The system of claim 13, wherein the controller is configured to detect a direction of travel of the first drone and configure the second drone to assist the first drone to move in the direction of travel.

15. The system of claim 14, wherein configuring the second drone to assist the first drone to move in the direction of travel comprises orienting one or more propellers of the second drone to propel the second drone in the direction of travel.

16. The system of claim 14, wherein configuring the second drone to assist the first drone to move in the direction of travel comprises controlling a speed of at least one motor in the second drone.

17. A method comprising:
mounting a first drone upon an automobile, the first drone comprising an anchor assembly for detachably anchoring a second drone to the first drone;
positioning a second drone on the first drone, wherein the second drone comprises a leg, and wherein the anchor assembly comprises a releasable anchor;
activating the releasable anchor to retain the leg in an anchored position on the first drone;
launching the first drone from the automobile in a tethered mode of flight;
configuring the second drone that is detachably anchored to the first drone, to assist the first drone to move in a direction of travel during the tethered mode of flight;
activating the releasable anchor to release the leg; and
launching the second drone from the first drone in an untethered mode of flight.

18. The method of claim 17, wherein configuring the second drone to assist the first drone to move in the direction of travel comprises orienting one or more propellers of the second drone to propel the second drone in the direction of travel of the first drone.

19. The method of claim 17, wherein configuring the second drone to assist the first drone to move in the direction of travel comprises providing one or more control signals for configuring the second drone to assist the first drone to move in the direction of travel.

20. The method of claim 17, wherein configuring the second drone to assist the first drone to move in the direction of travel comprises configuring a first rotor of the detachable drone to match a second rotor of the carrier drone.

* * * * *